United States Patent
Park et al.

(10) Patent No.: US 10,616,798 B2
(45) Date of Patent: Apr. 7, 2020

(54) METHOD FOR TRANSMITTING AND RECEIVING SIGNAL INCLUDING PHYSICAL PROTOCOL DATA UNIT IN WIRELESS LAN SYSTEM AND APPARATUS THEREFOR

(71) Applicant: LG ELECTRONICS INC., Seoul (KR)

(72) Inventors: Sungjin Park, Seoul (KR); Jinmin Kim, Seoul (KR); Jinsoo Choi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/322,101

(22) PCT Filed: Mar. 12, 2018

(86) PCT No.: PCT/KR2018/002897
§ 371 (c)(1),
(2) Date: Jan. 30, 2019

(87) PCT Pub. No.: WO2018/164554
PCT Pub. Date: Sep. 13, 2018

(65) Prior Publication Data
US 2019/0191331 A1     Jun. 20, 2019

Related U.S. Application Data

(60) Provisional application No. 62/475,171, filed on Mar. 22, 2017, provisional application No. 62/469,541, filed on Mar. 10, 2017.

(51) Int. Cl.
*H04L 1/00* (2006.01)
*H04W 28/06* (2009.01)
(Continued)

(52) U.S. Cl.
CPC ........... *H04W 28/06* (2013.01); *H04L 1/0003* (2013.01); *H04L 1/0025* (2013.01); *H04L 27/18* (2013.01);
(Continued)

(58) Field of Classification Search
None
See application file for complete search history.

(56) References Cited

U.S. PATENT DOCUMENTS 9,661,638 B2 * 5/2017 Rebeiz ............. H04W 72/0493
9,847,849 B2 * 12/2017 Greenberg ........... H04L 1/0009
(Continued)

FOREIGN PATENT DOCUMENTS

KR     20160135750 A  * 11/2016  ............. H04L 5/005
KR     20160138106 A  * 12/2016  ............. H04L 27/26
(Continued)

OTHER PUBLICATIONS

Hiroyuki Motozuka et.al, 'L-Header spoofing for EDMG SC PPDU', IEEE 802.11-17/0105r0, Jan. 16, 2017. See entire document. (Year: 2017).*
(Continued)

*Primary Examiner* — Ajit Patel
(74) *Attorney, Agent, or Firm* — Lee Hong Degerman Kang & Waimey

(57) ABSTRACT

Disclosed in the present specification are a method for transmitting and receiving a signal including a physical protocol data unit (PPDU) in a wireless LAN (WLAN) system and an apparatus therefor. Specifically, disclosed in the present specification are a method for transmitting and receiving a signal and an apparatus therefor, which, in a PPDU supported by a specific wireless LAN system, can minimize an overall length error (also known as "spoofing error") of the PPDU that is assumed to occur between a station capable of decoding all fields in the PPDU and a station capable of decoding only some fields in the PPDU.

8 Claims, 16 Drawing Sheets

(51) Int. Cl.
  *H04L 27/26* (2006.01)
  *H04L 27/18* (2006.01)
  *H04W 84/12* (2009.01)

(52) U.S. Cl.
  CPC ...... *H04L 27/2602* (2013.01); *H04L 27/2626* (2013.01); *H04L 1/0009* (2013.01); *H04W 84/12* (2013.01)

(56) References Cited

U.S. PATENT DOCUMENTS

| | | | | |
|---|---|---|---|---|
| 9,877,324 | B2* | 1/2018 | Seok | H04W 74/0816 |
| 9,936,492 | B2* | 4/2018 | Wentink | H04L 69/323 |
| 9,979,452 | B2* | 5/2018 | Park | H04B 7/0617 |
| 10,097,250 | B2* | 10/2018 | Choi | H04L 27/26 |
| 10,165,551 | B2* | 12/2018 | Bharadwaj | H04W 72/042 |
| 10,212,086 | B2* | 2/2019 | Merlin | H04L 47/12 |
| 2016/0249332 | A1 | 8/2016 | Xin et al. | |
| 2017/0033949 | A1 | 2/2017 | Eitan et al. | |
| 2017/0134235 | A1* | 5/2017 | Wu | H04L 27/2621 |
| 2018/0013480 | A1* | 1/2018 | Lomayev | H04B 7/0639 |

FOREIGN PATENT DOCUMENTS

| | | |
|---|---|---|
| WO | 2016/167908 | 10/2016 |
| WO | 2016/175944 | 11/2016 |

OTHER PUBLICATIONS

Hiroyuki Motozuka et.al, 'L-Header spoofing and bit resue', IEEE 802.11-16/1422r0, Nov. 8, 2016. See entire document. (Year: 2016).*

PCT International Application No. PCT/KR2018/002897, International Search Report dated Jul. 9, 2018, 4 pages.

Motozuka, H. et al., "L-Header spoofing for EDMG SC PPDU", doc.: IEEE 802.11-17/0105r0, Jan. 2017, 16 pages.

Motozuka, H. et al., "L-Header spoofing and bit reuse", doc.: IEEE 802.11-16/1422r0, Nov. 2016, 18 pages.

Da Silva, C. et al., "Spooling of EDMG Control Mode PPDUs", doc.: IEEE 802.11-17/0053r0, Jan. 2017, 11 pages.

European patent application No. 18763069.4, European search report dated Feb. 5, 2020, 8 pages.

* cited by examiner

FIG. 9

| CH 1 | L - STF | L - CE | L - Header | ay Header A | ay STF | ay CE | ay Header B | ay payload |
|---|---|---|---|---|---|---|---|---|
| | GF-STF | GF-CE | | | | | | |
| CH 2 | L - STF | L - CE | L - Header | ay Header A | | | | |

(L: Legacy, GF: Gap Filling, ay: 802.11ay)

US 10,616,798 B2

METHOD FOR TRANSMITTING AND RECEIVING SIGNAL INCLUDING PHYSICAL PROTOCOL DATA UNIT IN WIRELESS LAN SYSTEM AND APPARATUS THEREFOR

CROSS-REFERENCE TO RELATED APPLICATIONS

This application is the National Stage filing under 35 U.S.C. 371 of International Application No. PCT/KR2018/002897, filed on Mar. 12, 2018, which claims the benefit of U.S. Provisional Application No. 62/469,541, filed on Mar. 10, 2017, and 62/475,171, filed on Mar. 22, 2017, the contents of which are all hereby incorporated by reference herein in their entirety.

BACKGROUND OF THE INVENTION

Field of the Invention

The following description relates to a method and a device for the same for transmitting and receiving a signal including a physical protocol data unit (PPDU) of a station in a wireless local area network (WLAN) system.

More specifically, the following description relates to a method of transmitting and receiving a signal and an device for the same capable of minimizing an entire length error (referred to as a spoofing error) of a PPDU assumed to occur between a station capable of decoding all fields of the PPDU and a station capable of decoding only some fields of the PPDU in the PPDU supported by a specific wireless LAN system.

Related Art

A standard for the wireless LAN technology is being developed as an Institute of Electrical and Electronics Engineers (IEEE) 802.11 standard. IEEE 802.11a and b use an unlicensed band in 2.4. GHz or 5 GHz. And, IEEE 802.11b provides a transmission rate of 11 Mbps, and IEEE 802.11a provides a transmission rate of 54 Mbps. And, IEEE 802.11g provides a transmission rate of 54 Mbps by applying orthogonal frequency-division multiplexing (OFDM). IEEE 802.11n provides a transmission rate of 300 Mbps on 4 spatial streams by applying multiple input multiple output-OFDM (MIMO-OFDM). The IEEE 802.11n supports a channel bandwidth of up to 40 MHz, and, in this case, the IEEE 802.11n provides a transmission rate of 600 Mbps.

The above-described wireless LAN (WLAN) standard was previously defined as the IEEE 802.11 ac standard, which uses a maximum bandwidth of 160 MHz, supports 8 spatial streams, and supports a maximum rate of 1 Gbit/s. And, discussions are now being made on the IEEE 802.11 lax standardization.

Meanwhile, the IEEE 802.11 ad system regulates a capability enhancement for an ultra-high speed throughput in a 60 GHz band, and, for the first time, in the above-described IEEE 802.11ad system, discussions are being made on an IEEE 802.11ay for adopting channel bonding and MIMO techniques.

SUMMARY OF THE INVENTION

An 11ay system applicable to the present invention can support signal transmission and reception of a physical protocol data unit that supports intercompatibility with a legacy system.

More specifically, the present invention provides a method of transmitting and receiving a signal and a device for the same that can minimize an entire length error (referred to as a spoofing error) of a PPDU assumed to occur by a station operating by a legacy system for a PPDU supporting in an 11ay system.

In an aspect, there is provided a method in which a first station (STA) transmits a signal to a second STA in a wireless local area network (WLAN) system including calculating/obtaining $N_{BLKS}'$, which is a minimum natural number among the number of single carrier (SC) blocks having a length equal to or greater than a length of a second portion among a first portion and a second portion included in a physical protocol data unit (PPDU) to be transmitted; setting a value of $N_{BLKS}$ (where $N_{BLKS}$ is a natural number) and a value of $N_{TRN}$ (where $N_{TRN}$ is an integer equal to or greater than 0) of a header field included in the PPDU according to/based on a value of the $N_{BLKS}'$ and an applied modulation and coding scheme (MCS); and transmitting a PPDU including the first portion and the second portion.

In another aspect, there is provided a station device for transmitting a signal in a wireless local area network (WLAN) system including a transceiver having at least one radio frequency (RF) chain and configured to transmit and receive a signal to and from another station device; and a processor connected to the transceiver to process a signal transmitted and received to and from the another station device, wherein the processor is configured to calculate/obtain $N_{BLKS}'$, which is a minimum natural number among the number of single carrier (SC) blocks having a length equal to or greater than a length of a second portion among a first portion and a second portion included in a physical protocol data unit (PPDU) to be transmitted; to set a value of $N_{BLKS}$ (where $N_{BLKS}$ is a natural number) and a value of $N_{TRN}$ (where $N_{TRN}$ is an integer equal to or greater than 0) of a header field included in the PPDU according to/based on a value of the $N_{BLKS}'$ and an applied modulation and coding scheme (MCS); and to transmit a PPDU including the first portion and the second portion.

In the configuration, the setting of a value of $N_{BLKS}$ may include (A) setting a value of the $N_{BLKS}$ to be equal to a value of $N_{BLKS}'$ and setting a value of the $N_{TRN}$ to 0, when the applied MCS is not binary phase shift keying (BPSK); (B) setting a value of the $N_{BLKS}$ to be equal to a value of $N_{BLKS}'$ and setting a value of the $N_{TRN}$ to 0, when the applied MCS is BPSK and the $N_{BLKS}'$ mod 3≠1; and (C) setting a value of the $N_{BLKS}$ to a value smaller by 19 or 20 than $N_{BLKS}'$ and setting a value of the $N_{TRN}$ to 2, when the applied MCS is BPSK and the $N_{BLKS}'$ mod 3=1.

Here, when the applied MCS is BPSK and the $N_{BLKS}'$ mod 3=1, if a difference value between a length of the number of SC blocks corresponding to the $N_{BLKS}'$ and a length of the second portion is equal to or greater than a length of a ½ SC block, a value of the $N_{BLKS}$ may be set to a value smaller by 20 than $N_{BLKS}'$, and if a difference value between a length of the number of SC blocks corresponding to the $N_{BLKS}'$ and a length of the second portion is smaller than a length of a ½ SC block, a value of the $N_{BLKS}$ may be set to a value smaller by 19 than $N_{BLKS}'$.

Further, in the configuration, the PPDU may correspond to an enhanced directional multi gigabit (EDMG) PPDU. In this case, the first portion may correspond to a non-EDMG portion of the EDMG PPDU, and the second portion may correspond to an EDMG portion of the EDMG PPDU.

In this case, the header field may correspond to a legacy header (L-header) field included in the non-EDMG portion.

Further, the first portion may be transmitted earlier than the second portion in a time domain.

In another aspect, there is provided a method in which a first station (STA) receives a signal from a second STA in a wireless local area network (WLAN) system including receiving a physical protocol data unit (PPDU) including a header field from the second STA, wherein a value of $N_{BLKS}$ (where $N_{BLKS}$ is a natural number) and a value of $N_{TRN}$ (where $N_{TRN}$ is an integer equal to or greater than 0) of the header field are set according to/based on a value of $N_{BLKS}'$ and a modulation and coding scheme (MCS) applied to the PPDU, and the $N_{BLKS}'$ corresponds to a minimum natural number among the number of single carrier (SC) blocks having a length equal to greater than a length of a second portion among a first portion and a second portion included in the PPDU.

In another aspect, there is provided a station device for receiving a signal in a wireless local area network (WLAN) system including a transceiver having at least one radio frequency (RF) chain and configured to transmit and receive a signal to and from another station device; and a processor connected to the transceiver to process a signal transmitted and received to and from the another station device, wherein the processor is configured to receive a physical protocol data unit (PPDU) including a header field from the another station device, a value of $N_{BLKS}$ (where $N_{BLKS}$ is a natural number) and a value of $N_{TRN}$ (where $N_{TRN}$ is an integer equal to or greater than 0) of the header field are set according to/based on a value of $N_{BLKS}'$ and a modulation and coding scheme (MCS) applied to the PPDU, and the $N_{BLKS}'$ corresponds to a minimum natural number among the number of single carrier (SC) blocks having a length equal to or greater than a length of a second portion among a first portion and a second portion included in the PPDU.

In the configuration, the first STA may estimate an entire length of the PPDU based on the value of the $N_{BLKS}$ and the value of the $N_{TRN}$.

Thereafter, the first STA may set a network allocation vector (NAV) of a channel transmitted by the PPDU based on an estimated entire length of the PPDU or may limit signal transmission and reception in a channel transmitted by the PPDU within an estimated entire length of the PPDU.

The effect that can be obtained from the present invention is not limited to the above-described effects and the other effects will be understood by those skilled in the art from the following description.

Advantageous Effects

When a station according to/based on the present invention generates and transmits a PPDU through the above configuration, the difference in an entire length of the PPDU estimated for both the case in which the station, having received the PPDU is a station (e.g., 11ay station) capable of decoding all fields of the PPDU and the case in which the station, having received the PPDU is a station (e.g., 11ay station) capable of decoding only some fields of the PPDU can be minimized. Thereby, requirements required in a wireless communication system (e.g., 11ay system) applicable to the present invention can be satisfied.

The effect that can be obtained from the present invention is not limited to the above-described effects and the other effects will be understood by those skilled in the art from the following description.

BRIEF DESCRIPTION OF THE DRAWINGS

The appended drawings of this specification are presented to provide a further understanding of the present invention and are incorporated in and constitute a part of this application, illustrate embodiments of the invention and serve to explain the principle of the invention along with the description of the present invention.

FIG. 9 is a diagram showing a PPDU structure that can be applied to the present invention.

DESCRIPTION OF EXEMPLARY EMBODIMENTS

Hereinafter, the preferred embodiment of the present invention will be described in detail with reference to the appended drawings. The detailed description that will hereinafter be disclosed along with the appended drawings will only be provided to describe an exemplary embodiment of the present invention. And, therefore, it should be understood that the exemplary embodiment presented herein will not represent the only embodiment for carrying out the present invention.

The following detailed description includes specific details for providing a full understanding of the present invention. However, it will be apparent to anyone skilled in the art that the present invention can be carried out without referring to the above-mentioned specific details. In some cases, in order to avoid any ambiguity in the concept of the present invention, the disclosed structure and device may be omitted, or the disclosed structure and device may be illustrated as a block diagram based on their core functions.

Although diverse mobile communication systems applying the present invention may exist, a wireless LAN (WLAN) system will hereinafter be described in detail as an example of such mobile communication system.

1. Wireless LAN (WLAN) System 1-1. General Wireless LAN (WLAN) System

Figure 1:
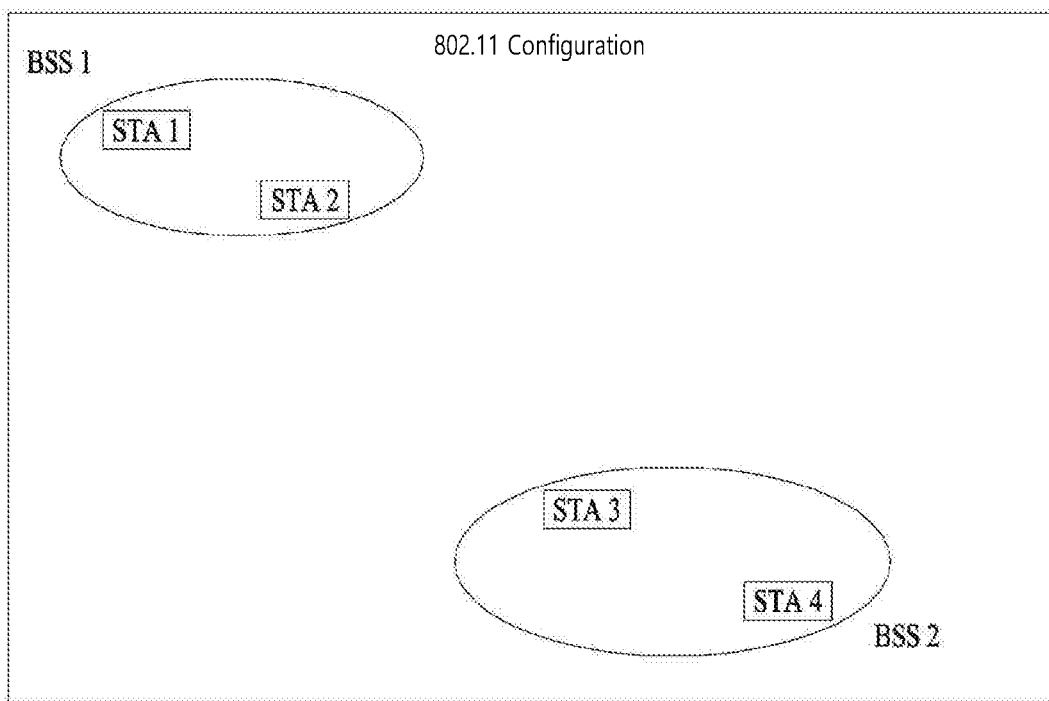
FIG. 1 is a diagram showing an exemplary configuration of a wireless LAN (WLAN) system.

FIG. 1 is a diagram showing an exemplary configuration of a wireless LAN (WLAN) system.

As shown in FIG. 1, a wireless LAN (WLAN) includes one or more Basic Service Set (BSS). A BSS is a set (or group) of stations (STAs) that successfully achieve synchronization so as to communication with one another.

As a logical entity including a Medium Access Control (MAC) and a Physical Layer interface for a wireless medium, an STA includes an access point (AP) and a non-AP Station. Among the STAs, a portable device (or terminal) that is operated by a user corresponds to a non-AP Station. And, therefore, when an entity is simply mentioned to as an STA, the STA may also refer to a non-AP Station. Herein, the non-AP Station may also be referred to as other terms, such as a terminal, a wireless transmit/receive unit (WTRU), a user equipment (UE), a mobile station (MS), a mobile terminal, a mobile subscriber unit, and so on.

Additionally, the AP is an entity providing its associated station (STA) with an access to a distribution system (DS) through a wireless medium. Herein, the AP may also be referred to as a centralized controller, a base station (B), a Node-B, a base transceiver system (BTS), a personal basic service set central point/access point (PCP/AP), a site controller, and so on.

A BSS may be categorized as an infrastructure BSS and an independent BSS (IBSS).

The BSS shown in FIG. 1 corresponds to an IBSS. The IBSS refers to a BSS that does not include an AP. And, since the BSS does not include an AP access to the DS is not authorized (or approved), and, therefore, the IBSS functions as a self-contained network.

Figure 2:
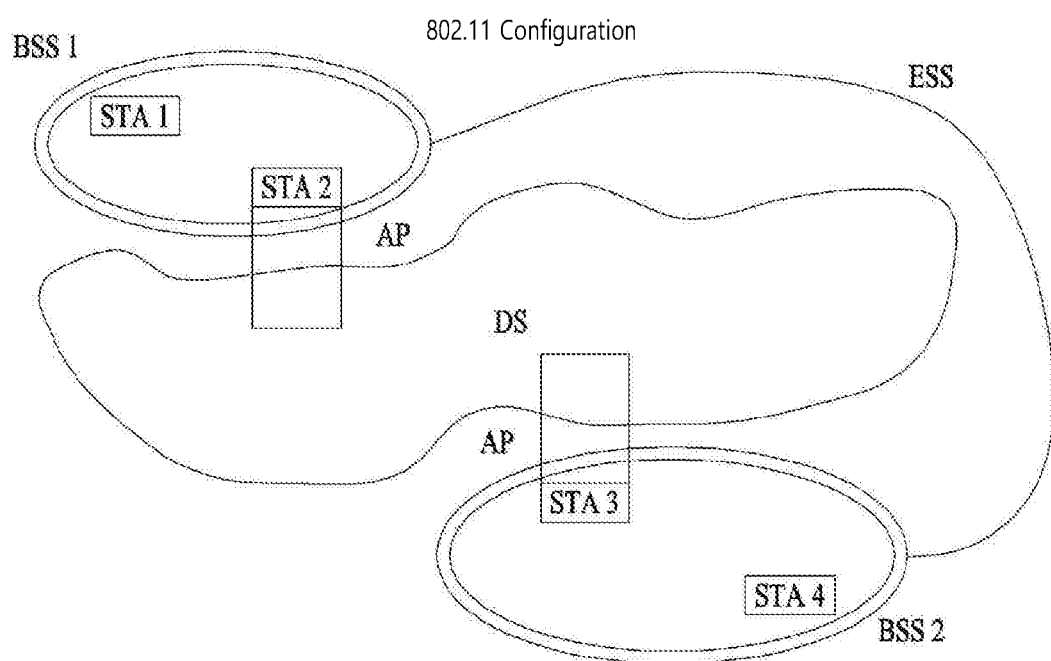
FIG. 2 is a diagram showing another exemplary configuration of a wireless LAN (WLAN) system.

FIG. 2 is a diagram showing another exemplary configuration of a wireless LAN (WLAN) system.

The BSS shown in FIG. 2 corresponds to an infrastructure BSS. The infrastructure BSS includes one or more STAs and APs. As a rule, although the communication between non-AP STAs is established by passing through the AP, in case a direct link is configured between the non-AP STAs, direct communication may also be established between the non-AP STAs.

As shown in FIG. 2, a plurality of infrastructure BSSs may be interconnected to one another through the DS. The plurality of BSSs being interconnected to one another through the DS is collectively referred to as an extended service set (ESS). The STAs being included in the ESS may perform communication between one another, and, a non-AP STA may shift (or relocate) from one BSS to another BSS within the same ESS while performing uninterrupted communication.

As a mechanism that connects the plurality of APs, the DS is not necessarily required to correspond to a network. As long as the DS is capable of providing a predetermined distribution service, there is no limitation in the structure or configuration of the DS. For example, the DS may correspond to a wireless network, such as a mesh network, or the DS may correspond to a physical structure (or entity) that connects the APs to one another.

Hereinafter, a channel bonding method that is performed in a wireless LAN system will hereinafter be described in detail based on the description presented above.

1-2. Channel Bonding in a Wireless LAN (WLAN) System

Figure 3:
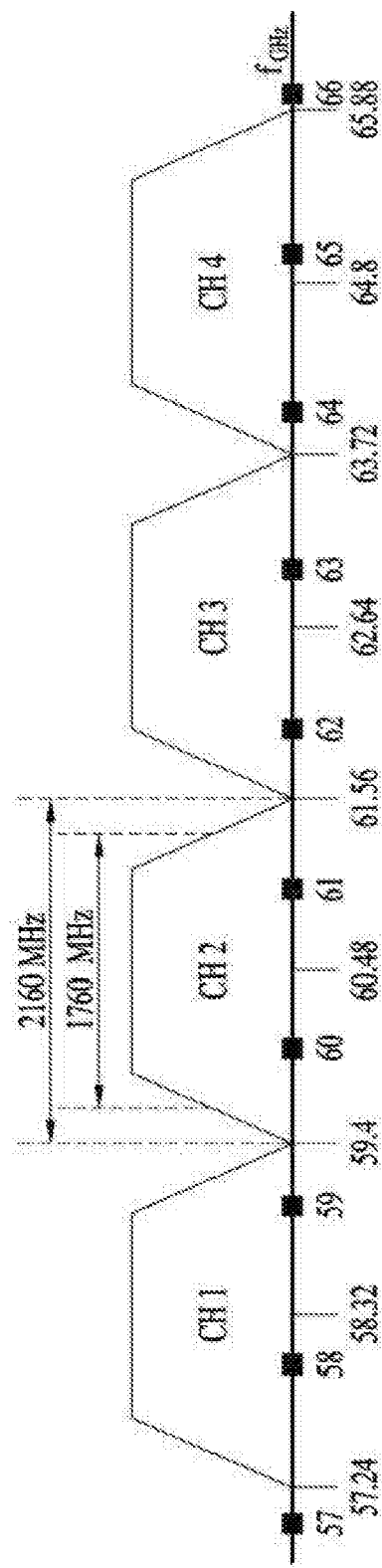
FIG. 3 is a diagram describing a channel in a 60 GHz band for describing a channel bonding operation according to an exemplary embodiment of the present invention.

FIG. 3 is a diagram describing a channel in a 60 GHz band for describing a channel bonding operation according to an exemplary embodiment of the present invention.

As shown in FIG. 3, 4 channels may be configured in a 60 GHz band, and a general channel bandwidth may be equal to 2.16 GHz. An ISM band (57 GHz~66 GHz), which is available for usage in 60 GHz, may be differently regulated in accordance with the circumstances (or situations) of each country. Generally, among the channels shown in FIG. 3, since Channel 2 is available for usage is all regions, Channel 2 may be used as a default channel. Channel 2 and Channel 3 may be used is most regions excluding Australia. And, accordingly, Channel 2 and Channel 3 may be used for channel bonding. However, it shall be understood that diverse channels may be used for channel bonding. And, therefore, the present invention will not be limited to only one or more specific channels.

Figure 4:
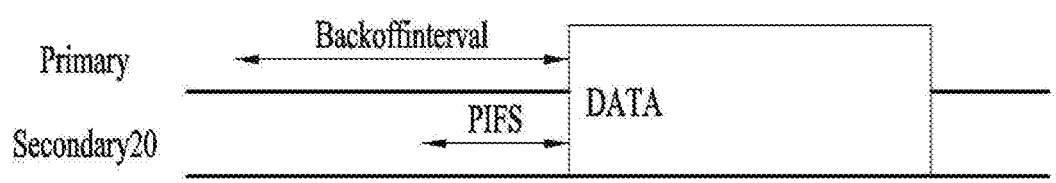
FIG. 4 is a diagram describing a basic method for performing channel bonding in a wireless LAN (WLAN) system.

FIG. 4 is a diagram describing a basic method for performing channel bonding in a wireless LAN (WLAN) system.

The example shown in FIG. 4 corresponds to an example of combining two 20 MHz channels and operating (or using) the combined channels for 40 MHz channel bonding in an IEEE 802.11n system. In case of an IEEE 802.11ac system, 40/80/160 MHz channel bonding may be performed.

The two exemplary channels of FIG. 4 include a primary channel and a secondary channel, and the STA may examine the channel status of the primary channel, among the two channels, by using a CSMA/CA method. If the primary channel is idle during a constant backoff interval, and, at a time point where the backoff count is equal to 0, if the secondary channel is idle during a predetermined period of time (e.g., PIFS), the STA may transmit data by combining the primary channel and the secondary channel.

However, in case of performing contention-based channel bonding, as shown in FIG. 4, as described above, since channel bonding can be performed only in a restricted case where the secondary channel maintains the idle state during a predetermined period of time at a time point where the backoff count for the primary channel is expired, the usage of channel bonding is very restricted (or limited). And, therefore, there lies a difficulty in that measures cannot be flexibly taken in accordance with the circumstances (or situation) of the medium.

Accordingly, in an aspect of the present invention, a solution (or method) for performing scheduling-based access by having the AP transmit scheduling information to the STAs is proposed. Meanwhile, in another aspect of the present invention, a solution (or method) for performing contention-based channel access based on the above-described scheduling or independently from the above-described scheduling is proposed. Furthermore, in yet another aspect of the present invention, a method for performing communication through a spatial sharing technique based on beamforming is proposed.

1-3. Beacon Interval Configuration

Figure 5:
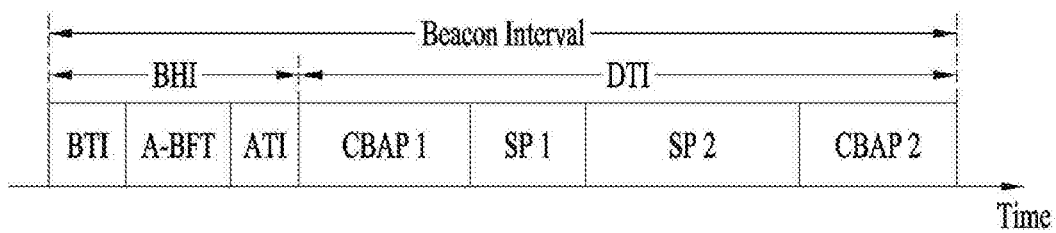
FIG. 5 is a diagram describing a configuration of a beacon interval.

FIG. 5 is a diagram describing a configuration of a beacon interval.

In an h ad-based DMG BSS system, the time of medium may be divided into beacon intervals. A lower level period within the beacon interval may be referred to as an access period. Each of the different access periods within one beacon interval may have a different access rule. Such information on the access period may be transmitted by an AP or personal basic service set control point (PCP) to a non-AP STA or non-PCP.

As shown in the example of FIG. 5, one beacon interval may include one Beacon Header Interval (BHI) and one Data Transfer Interval (DTI). As shown in FIG. 4, the BHI may include a Beacon Transmission Interval (BTI), an Association Beamforming Training (A-BFT), and an Announcement Transmission Interval (ATI).

The BTI refers to a period (or section or duration) during which one more DMG beacon frames may be transmitted.

The A-BFT refers to a period during which beamforming training is performed by an STA, which has transmitted a DMG beacon frame during a preceding BTI. The ATI refers to a request-response based management access period between PCP/AP and non-PCP/non-AP STA.

Meanwhile, the Data Transfer Interval (DTI) refers to a period during which a frame exchange is performed between the STAs. And, as shown FIG. 5, one or more Contention Based Access Periods (CBAPs) and one or more Service Periods (SPs) may be allocated (or assigned) to the DTI. Although FIG. 5 shows an example where 2 CBAPs and 2 SPs are allocated to the DCI, this is merely exemplary. And, therefore, the present invention is not necessarily required to be limited only to this.

Hereinafter, a physical layer configuration in a wireless LAN (WLAN) system, in which the present invention is to be applied, will be described in detail.

1-4. Physical Layer Configuration

It will be assumed that the wireless LAN (WLAN) system according to an exemplary embodiment of the present invention may provide 3 different modulations mode as shown below.

TABLE 1

| PHY | MCS | Note |
|---|---|---|
| Control PHY | 0 | |
| Single carrier PHY (SC PHY) | 1 . . . 12<br>25 . . . 31 | (low power SC PHY) |
| OFDM PHY | 13 . . . 24 | |

Such modulation modes may be used for satisfying different requirements (e.g., high throughput or stability). Depending upon the system, among the modulation modes presented above, only some of the modulation modes may be supported.

Figure 6:
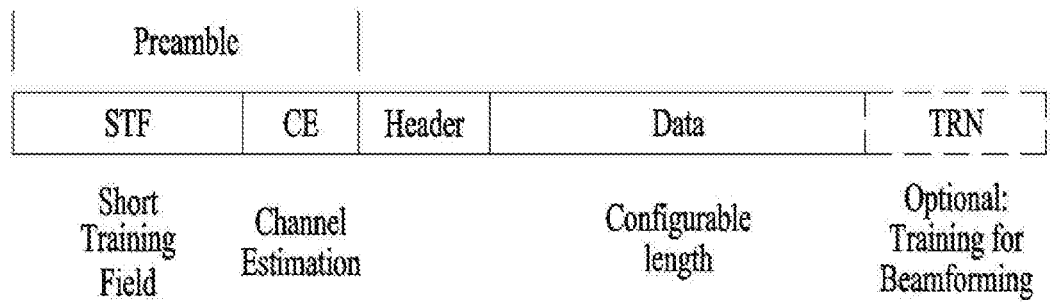
FIG. 6 is a diagram describing a physical configuration of a legacy radio frame.

FIG. 6 is a diagram describing a physical configuration of a legacy radio frame.

It will be assumed that all Directional Multi-Gigabit (DMG) physical layers commonly include the fields that are shown below in FIG. 6. However, a regulation method of each individual field and a modulation/coding scheme used in each field may vary depending upon each mode.

As shown in FIG. 6, a preamble of a radio frame may include a Short Training Field (STF) and a Channel Estimation (CE). Additionally, the radio frame may also include a header and a data field as a payload of the radio frame and may optionally include a training (TRN) field for beamforming.

Figure 7:
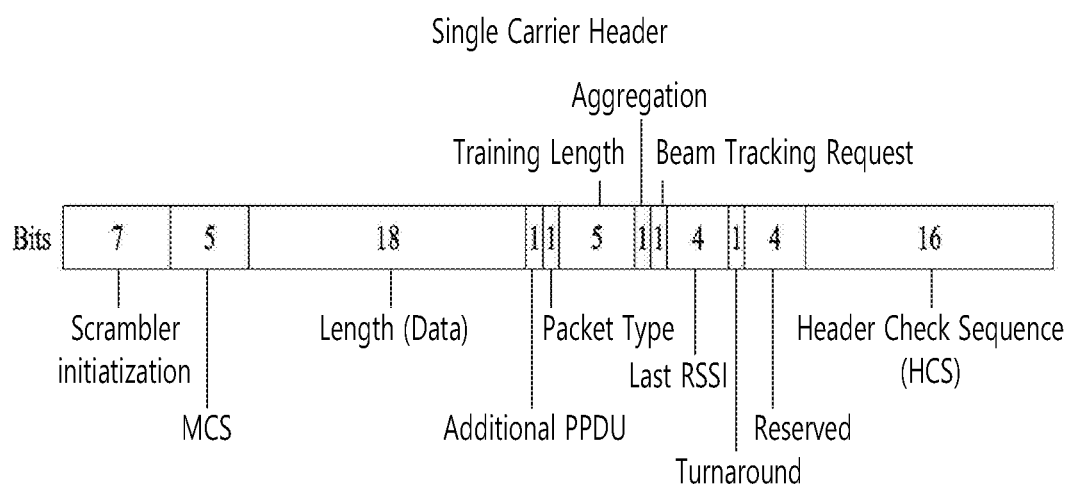
FIG. 7 and FIG. 8 are diagrams describing a configuration of a header field of the radio frame shown in FIG. 6.
Figure 8:
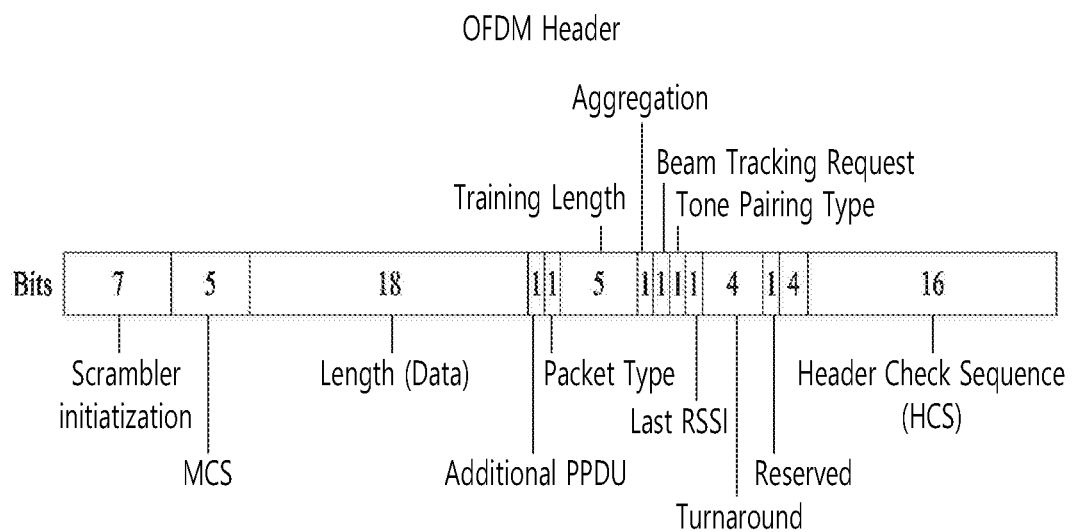

FIG. 7 and FIG. 8 are diagrams describing a configuration of a header field of the radio frame shown in FIG. 6.

More specifically, FIG. 7 illustrates a case where a Single Carrier (SC) mode is used. In the SC mode, the header may include information indicating an initial value of scrambling, information indicating a Modulation and Coding Scheme (MCS) and a data length, information indicating the presence or absence of an additional Physical Protocol Data Unit (PPDU), and information on a packet type, a training length, aggregation or non-aggregation, a presence or absence of a beam training request, a last Received Signal Strength Indicator (RSSI), truncation or non-truncation, a Header Check Sequence (HCS), and so on. Additionally, as shown in FIG. 7, the header has 4 bits of reserved bits, and, in the description presented below, such reserved bits may also be used.

Additionally, FIG. 8 illustrates a detailed configuration of a header corresponding to a case where the OFDM mode is applied. the header may include information indicating an initial value of scrambling, information indicating a MCS and a data length, information indicating the presence or absence of an additional PPDU, and information on a packet type, a training length, aggregation or non-aggregation, a presence or absence of a beam training request, a last RSSI, truncation or non-truncation, a Header Check Sequence (HCS), and so on. Additionally, as shown in FIG. 8, the header has 2 bits of reserved bits, and, just as int he case of FIG. 7, in the description presented below, such reserved bits may also be used.

As described above, the IEEE 802.11 ay system considers for the first time the adoption of channel bonding the MIMO technique to the legacy 11ad system. In order to implement channel boning and MIMO, the 11ay system requires a new PPDU structure. In other words, when using the legacy 11ad PPDU structure, there are limitations in supporting the legacy user equipment (UE) and implementing channel bonding and MIMO at the same time.

For this, a new field for the 11ay UE may be defined after the legacy preamble and legacy header field for supporting the legacy UE. And, herein, channel bonding and MIMO may be supported by using the newly defined field.

FIG. 9 is a diagram showing a PPDU structure according to a preferred embodiment of the present invention. In FIG. 9, a horizontal axis may correspond to a time domain, and a vertical axis may correspond to a frequency domain.

When two or more channels are bonded, a frequency band having a predetermined size (e.g., a 400 MHz band) may exist between a frequency band (e.g., 1.83 GHz) that is used between each channel. In case of a Mixed mode, a legacy preamble (legacy STF, legacy CE) is duplicated through each channel. And, according to the exemplary embodiment of the present invention, it may be considered to perform the transmission (gap filling) of a new STF and CE field along with the legacy preamble at the same time through the 400 MHz band between each channel.

In this case, as shown in FIG. 9, the PPDU structure according to the present invention has a structure of transmitting ay STF, ay CE, ay Header B, and ay payload after legacy preamble, legacy header, and ay Header A via wideband. Therefore, the ay Header and ay Payload fields, which are transmitted after the Header field, may be transmitted through the channels that are used for the channel bonding. Hereinafter, in order to differentiate the ay Header from the legacy Header, the ay Header may be referred to as an enhanced directional multi-gigabit (EDMG) Header, and the corresponding terms may be used interchangeably.

For example, a total of 6 channels or 8 channels (each corresponding to 2.16 GHz) may exist in the 11ay system, and a maximum of 4 channels may be bonded and transmitted to a single STA. Accordingly, the ay header and the ay Payload may be transmitted through bandwidths of 2.16 GHz, 4.32 GHz, 6.48 GHz, and 8.64 GHz.

Alternatively, a PPDU format of a case where the legacy preamble is repeatedly transmitted without performing the above-described gap-filling may also be considered.

In this case, since the Gap-Filling is not performed, the PPDU has a format of transmitting the ay STF, ay CE, and ay Header B after the legacy preamble, legacy header, and ay Header A without the GF-STF and GF-CE fields, which are illustrated in dotted lines in FIG. 8.

Figure 10:
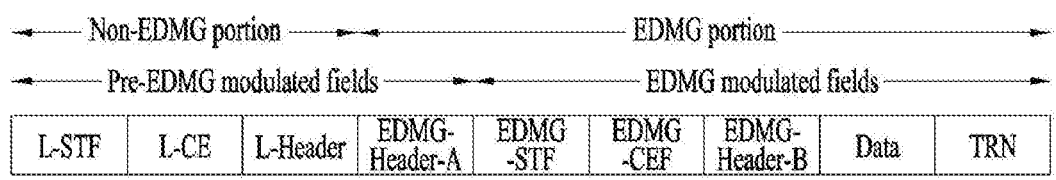
FIG. 10 is a diagram showing a simple PPDU structure that can be applied to the present invention.

FIG. 10 is a diagram showing a simple PPDU structure that can be applied to the present invention. When briefly summarizing the above-described PPDU format, the PPDU format may be illustrated as shown in FIG. 10.

As shown in FIG. 10, the PPDU format that is applicable to the 11ay system may include L-STF, L-CEF, L-Header, EDMG-Header-A, EDMG-STF, EDMG-CEF, EDMG-Header-B, Data, and TRN fields, and the above-mentioned fields may be selectively included in accordance with the format of the PPDU (e.g., SU PPDU, MU PPDU, and so on).

Herein, the part (or portion) including the L-STF, L-CEF, and L-header fields may be referred to as a Non-EDMG portion, and the remaining part (or portion) may be referred to as an EDMG portion (or region). Additionally, the L-STF, L-CEF, L-Header, and EDMG-Header-A fields may be referred to as pre-EDMG modulated fields, and the remaining fields may be referred to as EDMG modulated fields.

A (legacy) preamble part of the PPDU is used for packet detection, automatic gain control (AGC), frequency offset estimation, synchronization, indication of modulation (SC or OFDM), and channel estimation. A format of the preamble is common to both OFDM packets and SC packets. In this case, the preamble is composed of two parts: a short training field (STF) and a channel estimation (CE) field located after the STE 3. Embodiment Applicable to the Present Invention Hereinafter, a method will be described in detail in which a legacy STA (e.g., DMG STA) that can decode a non-EDMG portion of the EDMG PPDU of FIG. 10 based on the above-described technical configuration, but that does not decode an EDMG portion thereof estimates a length of the EDMG PPDU through an L-header field. In other words, hereinafter, a method will be described in detail in which an unintended EDMG or a legacy STA that does not decode an EDMG header field (e.g., EDMG Header-A field, EDMG Header-B field) including information indicating an accurate length of the EDMG portion included in the EDMG PPDU spoofs to obtain information on a duration of the EDMG PPDU (through information indicated by the L-header field).

In an IEEE 802.11ay system applicable to the present invention, requirements of a spoofing error for an EDMG single carrier (SC) mode PPDU or an EDMG OFDM mode PPDU may be defined as follows.

First, the spoofing error means a difference between a PPDU duration calculated/obtained based on an L-header and an actual PPDU duration, and more accurately, the spoofing error may mean a value corresponding to (A-B) obtained by subtracting an actual PPDU duration B from a PPDU duration A calculated/obtained based on an L-header. In this case, a spoofing error value should be set equal to or greater than 0 (i.e., non-negative) and should be set smaller than one symbol block (e.g., $512 \times T_c$). Here, $T_c$ is a (SC) chip time duration and may have a value of 0.57 ns.

In the present invention, a method of constructing an L-header field that may satisfy the above-described requirements of spoofing error and a method of transmitting and receiving a signal based on the method will be described in detail.

First, an EDMG STA for decoding an EDMG PPDU may calculate/obtain $TXTIME_{EDMG}$, which is a length of the EDMG PPDU based on Equation 1.

$$TXTIME_{EDMG} = T_{L-TF} + T_{L-CE} + T_{L-HEADER} + T_{EDMG\ Header-A} + T_{EDMG\ STF} + T_{EDMG\ CE} + T_{EDMG\ Header-B} + T_{Data} + T_{TRN} \quad [\text{Equation 1}]$$

In Equation 1, $T_{L-STF}$ represents a duration of an L-STF field, $T_{L-CE}$ represents a duration of an L-CE field, $T_{L-header}$ represents a duration of an L-header field, $T_{EDMG\ Header-A}$ represents a duration of an EDMG Header-A field, $T_{EDMG\ STF}$ represents a duration of an EDMG STF field, $T_{EDMG\ CE}$ represents a duration of an EDMG CE field, $T_{EDMG\ Header-B}$ represents a duration of an EDMG Header-B field, $T_{Data}$ represents a duration of a data field, and $T_{TRN}$ represents a duration of a TRN field.

However, a legacy STA (e.g., DMG STA) that does not decode an EDMG header field of the EDMG PPDU and/or an unintended EDMG STA for a multi user (MU)-EDMG PPDU may calculate/obtain a TXTIME (i.e., an approximate value of the EDMG PPDU), which is a duration of the EDMG PPDU as in Equation 2 based on the information obtained from the L-header.

$$TXTIME = \begin{cases} T_{STF} + T_{CE} + T_{Header} + T_{Data} & \text{for } N_{TRN} = 0 \\ T_{STF} + T_{CE} + T_{Header} + \\ \max\{T_{Data}, 9280T_c\} + & \text{for } N_{TRN} > 0 \\ N_{TRN} \times T_{TRN-Unit} \end{cases} \quad [\text{Equation 2}]$$

In Equation 2, $T_{STF} = T_{L-STF}$, $T_{CE} = T_{L-CE}$, $T_{L-Header} = T_{L-Header}$, and $T_{Data} = (512*N_{BLKS}) + 64)*T_c$. Here, $N_{BLKS}$ denotes the number of SC symbol blocks, and $T_c$ denotes an SC chip time duration.

In order to satisfy the above-described requirements of the spoofing error, Equation 3 should be satisfied.

$$0 \leq TXTIME - TXTIME_{EDMG} < 512T_c \quad [\text{Equation 3}]$$

However, $N_{BLKS}$, which is the number of SC symbol blocks may be differently set according to/based on a modulation and coding scheme (MCS).

More specifically, binary phase shift keying (BPSK), quadrature phase shift keying (QPSK), 16 quadrature amplitude modulation (QAM), and 64QAM may be applied to the MCS value.

In this case, when QPSK, 16QAM, or 64QAM is applied to the MCS value, the MCS provides a resolution corresponding to one symbol block (e.g., $512*T_c$), and a maximum PPDU duration (e.g., aPPDUMaxtime) becomes 2 ms or less. Therefore, when QPSK, 16QAM, or 64QAM is applied to the MCS value, Equation 3 may always be satisfied. However, the maximum PPDU duration is 2 ms or less.

However, when BPSK is applied to the MCS value, a BPSK MCS provides a resolution corresponding to one symbol block (e.g., $512*T_c$) or two symbol blocks (e.g., $1024*T_c$), and a maximum PPDU duration may reach 2 ms. Therefore, when BPSK is applied to the MCS value, Equation 3 may not always be satisfied. In other words, when BPSK is applied to the MCS value, it may not be guaranteed that requirements for the above-described spoofing error are always satisfied.

Accordingly, in the present invention, there is described a method of transmitting and receiving signals always satisfying spoofing error requirements even when BPSK is applied to the MCS value by setting a value of a training length field included in the L-header field to a value greater than 0.

Hereinafter, it will be described that a training length should be set to which value in order to satisfy the above-described requirements for the spoofing error.

First, when a BPSK MCS is used, applicable $N_{BLKS}$ ($N_{BLKS}^P$) is limited as in Equation 4.

$$N_{BLKS}^P = (2,3,5,6,8,9,11,12\ldots) \quad [\text{Equation 4}]$$

In other words, when a BPSK MCS is used, non-applicable $N_{BLKS}(N_{BLKS}^N)$ may be represented by Equation 5.

$$N_{BLKS}^N = \{1,4,7,10,13,16,19\ldots\} = 1 + 3(n-1), n=1,2,3,4,5\ldots \quad [\text{Equation 5}]$$

Therefore, even when a BPSK MCS is used, in order to always guarantee the spoofing error requirements, the $N_{BLKS}^N$ shall be always covered with $N_{BLKS}^P + N_{BLKS}^{TRN}$.

In an example according to the present invention, $N_{BLKS}$ for each corresponding training length value is given in Table 2.

TABLE 2

| | Training Length (the number of TRN unit) | | | | |
|---|---|---|---|---|---|
| | 1 | 2 | 3 | 4 | 5 ... |
| Corresponding $N_{BLKS}$ | 9.75 | 19.5 | 29.25 | 39 | 48.75 ... |

Hereinafter, it will be described that a training length should be set to which value in Table 2 in order to satisfy requirements for the above-described spoofing error.

For this reason, hereinafter, it assumed that a value of $N_{BLKS}^N$ is 52. In this case, $TXTIME_{EDMG}$ may have all values located between 51.00 SC block to 52.00 SC block. Therefore, it will be described whether all values of $TXTIME_{EDMG}$ are covered with a value of $N_{BLKS}^P + N_{BLKS}^{TRN}$.

Figure 11:
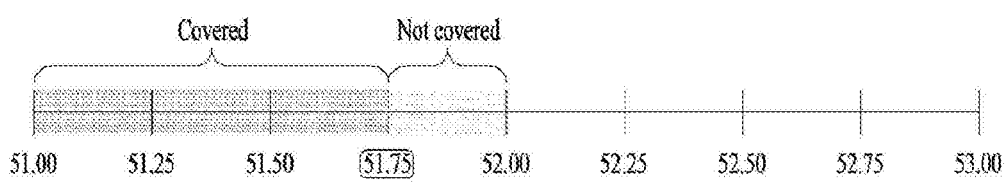
FIG. 11 is a diagram simply illustrating an area in which spoofing error requirements are satisfied when a TRN value is set to 1.

FIG. 11 is a diagram simply illustrating an area where spoofing error requirements are satisfied when a TRN value is set to 1.

In FIG. 11, a value of $N_{BLKS}^{TRN}$ corresponds to 9.75, and a value of $N_{BLKS}^P + N_{BLKS}^{TRN}$ may be 50.75 (when $N_{BLKS}^P$ is 41), 51.75 (when $N_{BLKS}^P$ is 42), and 53.75 (when $N_{BLKS}^P$ is 44), and the like.

In this case, when the $TXTIME_{EDMG}$ is calculated/obtained to 51.00 SC block to 51.75 SC block, a training field value may be set such that the TXTIME is calculated/obtained to 51.75 SC block. In this case, because a maximum spoofing error value is 0.75 SC block, spoofing error requirements are satisfied.

However, when the $TXTIME_{EDMG}$ is calculated/obtained to 51.75 SC block to 52.00 SC block, the training field value may be set such that the TXTIME is calculated/obtained to 53.00 SC block. In this case, because the maximum spoofing error value becomes 1.25 SC block, the spoofing error requirements are not satisfied.

Therefore, the TRN value set to 1 cannot satisfy spoofing error requirements in all cases where the BPSK MCS is used.

Figure 12:
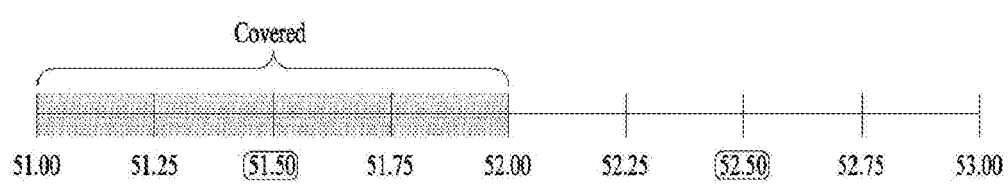
FIG. 12 is a diagram simply illustrating an area in which spoofing error requirements are satisfied when a TRN value is set to 2.

FIG. 12 is a diagram simply illustrating an area in which spoofing error requirements are satisfied when a TRN value is set to 2.

In FIG. 12, a value of $N_{BLKS}^{TRN}$ corresponds to 19.5, and a value of $N_{BLKS}^P + N_{BLKS}^{TRN}$ may be 51.5 (when $N_{BLKS}^P$ is 32), 52.5 (when $N_{BLKS}^P$ 33), and the like.

In this case, when the $TXTIME_{EDMG}$ is calculated/obtained to 51.00 SC block to 51.50 SC block, the training field value may be set such that the TXTIME is calculated/obtained to 51.50 SC block. In this case, because the maximum spoofing error value is 0.50 SC block, the spoofing error requirements are satisfied.

Further, when the $TXTIME_{EDMG}$ is calculated/obtained to 51.50 SC block to 52.00 SC block, the training field value may be set such that the TXTIME is calculated/obtained to 52.50 SC block. In this case, because the maximum spoofing error value becomes 0.50 SC block, the spoofing error requirements are satisfied.

Therefore, the TRN value set to 2 can satisfy the spoofing error requirements in all cases where a BPSK MCS is used.

Figure 13:
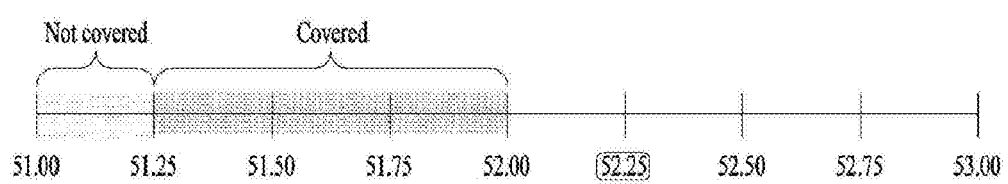
FIG. 13 is a diagram simply illustrating an area in which spoofing error requirements are satisfied when a TRN value is set to 3.

FIG. 13 is a diagram simply illustrating an area in which spoofing error requirements are satisfied when a TRN value is set to 3.

In FIG. 13, a value of $N_{BLKS}^{TRN}$ corresponds to 29.25, and a value of $N_{BLKS}^P + N_{BLKS}^{TRN}$ may be 50.25 (when $N_{BLKS}^P$ is 21), 52.25 (when $N_{BLKS}^P$ is 23), 53.25 (when $N_{BLKS}^P$ is 24), and the like.

In this case, when the $TXTIME_{EDMG}$ is calculated/obtained to 51.25 SC block to 52.00 SC block, the training field value may be set such that the TXTIME is calculated/obtained to 52.25 SC block. In this case, because the maximum spoofing error value is 1.00 SC block, the spoofing error requirements may be satisfied.

However, when the $TXTIME_{EDMG}$ is calculated/obtained to 51.00 SC block to 51.25 SC block, the training field value may be set such that the TXTIME is calculated/obtained to 52.25 SC block. In this case, because the maximum spoofing error value becomes 1.25 SC block, the spoofing error requirements are not satisfied.

Therefore, the TRN value set to 3 cannot satisfy the spoofing error requirements in all cases where the BPSK MCS is used.

Figure 14:
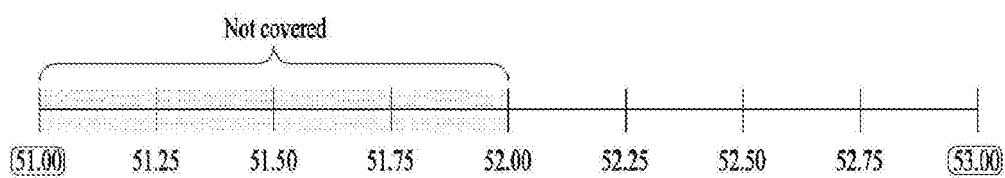
FIG. 14 is a diagram simply illustrating an area in which spoofing error requirements are satisfied when a TRN value is set to 4.

FIG. 14 is a diagram simply illustrating an area in which spoofing error requirements are satisfied when a TRN value is set to 4.

In FIG. 14, a value of $N_{BLKS}^{TRN}$ corresponds to 39.00, and a value of $N_{BLKS}^P + N_{BLKS}^{TRN}$ may be 51.00 (when $N_{BLKS}^P$ is 12) and 53.00 (when $N_{BLKS}^P$ is 14), and the like.

In this case, when the $TXTIME_{EDMG}$ is calculated/obtained to 51.00 SC block to 52.00 SC block, the training field value may be set such that the TXTIME is calculated/obtained to 53.00 SC block. In this case, because the maximum spoofing error value is 2.00 SC block, spoofing error requirements are not satisfied.

Therefore, the TRN value set to 2 can satisfy spoofing error requirements of all $N_{BLKS}$ when the BPSK MCS is used.

In this case, the TRN value set to 2 corresponds to 19.5 SC block, and when $N_{BLKS}$ is 20 or more, the training length field may be used for spoofing for a legacy STA.

Hereinafter, a method of setting or configuring a length field of an L-Header included in the EDMG PPDU will be described based on the above considerations.

First, the tentative number (hereinafter, referred to as '$N_{BLKS}'$') of SC symbol blocks may be calculated/obtained by Equation 6.

$$N'_{BLKS} = \left\lceil \frac{TXTIME_{EDMG} - (T_{STF} + T_{CE} + T_{Header}) - \frac{(64 \times T_c)}{512 \times T_c}}{} \right\rceil \quad \text{[Equation 6]}$$

In Equation 6, a parameter value is defined as described above, and [A] represents the smallest value among integers equal to or greater than A.

Thereafter, the number $N_{BLKS}$ of SC symbol blocks and a value $N_{TRN}$ of a training length field are calculated/obtained as follows according to/based on conditions.

(1) When an MCS index is greater than 5 (i.e., when QPSK, 16QAM, and 64QAM are applied), In this case, $N_{BLKS}$ and $N_{TRN}$ are set by Equation 7.

$N_{BLKS} = N_{BLKS}'$ $N_{TRN} = 0$ [Equation 7]

(2) when an MCS index is 5 or less, when $N_{BLKS}'$ is 20 or more, and when a value of $N_{BLKS}'$ is not 1+3 (n−1) (n is a natural number) (i.e., when BPSK is applied, when $N_{BLKS}'$ is 20 or more, and when $N_{BLKS}'$ mod $3 \neq 1$), In this case, $N_{BLKS}$ and $N_{TRN}$ are set by Equation 8.

$$N_{BLKS} = N_{BLKS}'$$

$$N_{TRN} = 0 \quad \text{[Equation 8]}$$

(3) When an MCS index is 5 or less, when $N_{BLKS}'$ is 20 or more, and when a value of $N_{BLKS}'$ is 1+3 (n−1) (n is a natural number) (i.e., when BPSK is applied, when $N_{BLKS}'$ is 20 or more, and when $N_{BLKS}'$ mod 3=1), In this case, $N_{TRN}$ is set to 2, and $N_{BLKS}$ is determined by Equation 9 according to/based on whether the difference between a value of $$\left\lceil \frac{TXTIME_{EDMG} - (T_{STF} + T_{CE} + T_{Header}) - (64 \times T_c)}{512 \times T_c} \right\rceil$$

and a value of $$\frac{TXTIME_{EDMG} - (T_{STF} + T_{CE} + T_{Header}) - (64 \times T_c)}{512 \times T_c}$$

is 0.5 or more.

If $N_{BLKS}' - 1 <$                                                 [Equation 9]

$$\frac{TXTIME_{EDMG} - (T_{STF} + T_{CE} + T_{Header}) - (64 \times T_c)}{512 \times T_c} \leq$$

$$N_{BLKS}' - 0.5$$

Then $N_{BLKS} = N_{BLKS}' - 20$

If $N_{BLKS}' - 0.5 <$ $$\frac{TXTIME_{EDMG} - (T_{STF} + T_{CE} + T_{Header}) - (64 \times T_c)}{512 \times T_c} \leq$$

$$N_{BLKS}'$$

Then $N_{BLKS} = N_{BLKS}' - 19$

Alternatively, Equation 9 may be summarized as in Equation 10.

$$\text{if } 0 < \frac{TXTIME - (T_{L-STF} + T_{L-CE} + T_{L-Header}) - \dfrac{(64 \times T_c)}{T_c}}{} \mod 512 \leq \quad \text{[Equation 10]}$$

$$256$$

$$N_{BLKS} = N_{BLKS}' - 20$$

else $$N_{BLKS} = N_{BLKS}' - 19$$

Further, the number $N_{CW}$ of low density parity check (LDPC) codewords may be calculated/obtained by Equation 11.

$$N_{BLKS} = \left\lceil \frac{N_{CW} \cdot L_{CW}}{N_{CBPB}} \right\rceil \quad \text{[Equation 11]}$$

$$N_{BLKS} - 1 < \frac{N_{CW} \cdot L_{CW}}{N_{CBPB}} \leq N_{BLKS}$$

$$\frac{N_{CBPB}}{L_{CW}} \cdot (N_{BLKS} - 1) < N_{CW} \leq \frac{N_{CBPB}}{L_{CW}} \cdot N_{BLKS}$$

Thereafter, a length of a physical layer convergence procedure service data unit (LDPC PSDU) may be calculated/obtained by Equation 12.

$$N_{CW} = \left\lceil \frac{\text{Length} \cdot 8}{\dfrac{L_{CW}}{\rho} \cdot R} \right\rceil \quad \text{[Equation 12]}$$

$$N_{CW} - 1 < \frac{\text{Length} \cdot 8}{\dfrac{L_{CW}}{\rho} \cdot R} \leq N_{CW}$$

$$\frac{\dfrac{L_{CW}}{\rho} \cdot R}{8} \cdot (N_{CW} - 1) < \text{Length} \leq \frac{\dfrac{L_{CW}}{\rho} \cdot R}{8} \cdot N_{CW}$$

In the above Equations, $L_{CW}$ denotes an LDPC codeword length, $N_{CBPB}$ denotes the number of coded bits per symbol block, p denotes a repetition factor (1 or 2), and R denotes a code rate.

Figure 15:
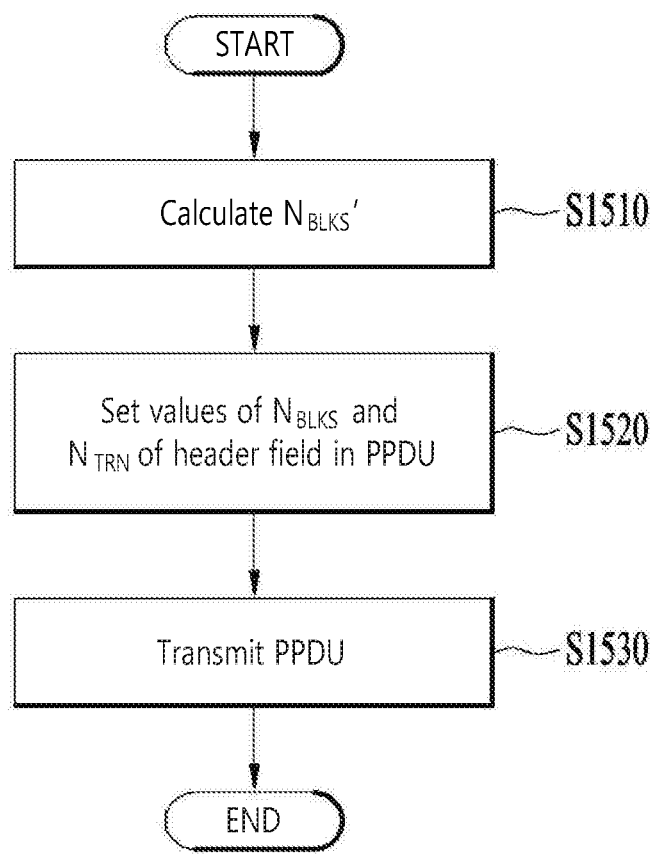
FIG. 15 is a flowchart illustrating a method of transmitting a signal of a station according to the present invention.

FIG. 15 is a flowchart illustrating a method of transmitting a signal of a station according to the present invention.

First, the station calculates/obtains $N_{BLKS}'$, which is a minimum natural number among the number of single carrier (SC) blocks having a length equal to or greater than a length of a second portion among a first portion and a second portion included in a physical protocol data unit (PPDU) to be transmitted (S1510).

In an exemplary embodiment applicable to the present invention, the PPDU may correspond to an enhanced directional multi gigabit (EDMG) PPDU illustrated in FIG. 10. In this case, the first portion may correspond to a non-EDMG portion of the EDMG PPDU, and the second portion may correspond to an EDMG portion of the EDMG PPDU.

In this case, the header field may correspond to an L-Header field included in the non-EDMG portion. Accordingly, the first portion may be transmitted earlier than the second portion in a time domain.

Thereafter, the station sets a value of $N_{BLKS}$ and a value of $N_{TRN}$ of the header field included in the PPDU according to/based on a value of the $N_{BLKS}'$ and a modulation and coding scheme (MCS) applied to the PPDU (S1520). Here, $N_{BLKS}$ is a natural number, and $N_{TRN}$ is an integer equal to or greater than 0.

More specifically, a configuration in which the station sets a value of $N_{BLKS}$ and a value of $N_{TRN}$ of the header field according to/based on a value of $N_{BLKS}'$ and an MCS applied to the PPDU may include (A) a configuration of setting a value of $N_{BLKS}$ to be equal to a value of the $N_{BLKS}'$ and setting a value of the $N_{TRN}$ to 0 when an MCS applied to the PPDU is not binary phase shift keying (BPSK), (B) a configuration of setting a value of the $N_{BLKS}$ to be equal to a value of the $N_{BLKS}'$ and setting a value of the $N_{TRN}$ to 0 when an MCS applied to the PPDU is BPSK and when $N_{BLKS}'$ mod 3 #1, and (C) a configuration of setting a value of the $N_{BLKS}$ to a value smaller by 19 or 20 than $N_{BLKS}'$ and setting a value of the $N_{TRN}$ to 2 when an MCS applied to the PPDU is BPSK and when $N_{BLKS}'$ mod 3=1.

In this case, when the MCS applied to the PPDU is BPSK and when $N_{BLKS}'$ mod 3=1, if a difference value between a length of the number of SC blocks corresponding to the $N_{BLKS}'$ and a length of the second portion is equal to or greater than a length of ½ SC block, a value of the $N_{BLKS}$ may be set to a value smaller by 20 than $N_{BLKS}'$, and if a difference value between a length of the number of SC blocks corresponding to $N_{BLKS}'$ and a length of the second portion is smaller than a length of ½ SC block, a value of the $N_{BLKS}$ may be set to a value smaller by 19 than $N_{BLKS}'$.

Thereafter, the station transmits the PPDU configured as described above (S1530).

The station, having received the transmitted PPDU may set differently interpretation methods of the PPDU according to/based on whether all fields of the PPDU can be decoded or whether only some fields (e.g., field within the first portion) of the PPDU can be decoded.

First, when the station, having received the transmitted PPDU can decode all fields of the PPDU, the station may determine whether the PPDU is a PPDU transmitted to the station and perform an operation (e.g., when the PPDU is a PPDU transmitted to the station, the station may decode data included in the transmitted PPDU or when the PPDU is not a PPDU transmitted to the station, the station may estimate a duration of the transmitted PPDU to limit signal transmission and reception in a corresponding channel during a duration of a corresponding PPDU) corresponding thereto.

Alternatively, when the station, having received the transmitted PPDU can decode only some fields of the PPDU, the station may estimate an entire length of the PPDU based on a value of $N_{BLKS}$ and a value of $N_{TRN}$ indicated by a decodable header field within the PPDU.

In this case, the station may not decode actual data included in the PPDU, and the station may set a network allocation vector (NAV) of a channel transmitted by the PPDU based on an estimated entire length of the PPDU or may limit signal transmission and reception in a channel transmitted by the PPDU within an entire length of the estimated PPDU.

4. Device Configuration

Figure 16:
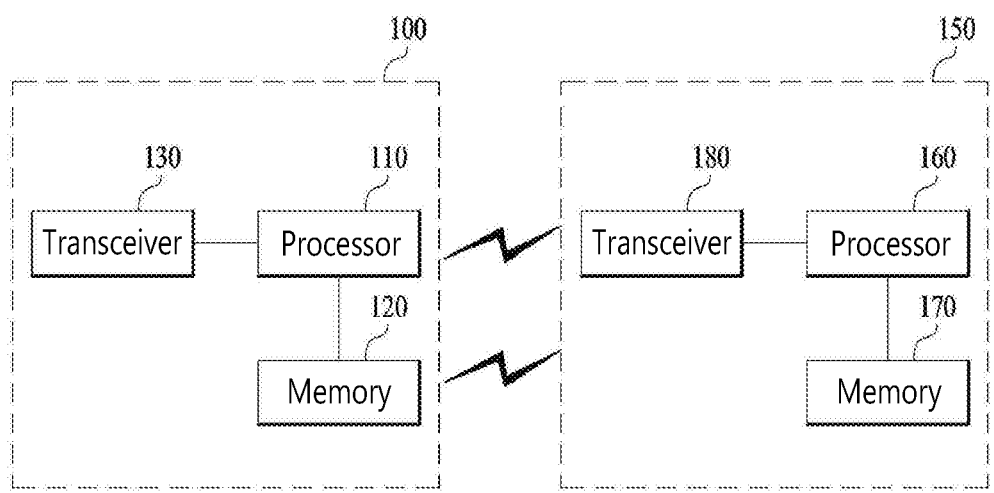
FIG. 16 is a diagram illustrating a device for implementing the above-described method.

FIG. 16 is a diagram illustrating a device for implementing the above-described method.

A wireless device 100 of FIG. 16 may correspond to an STA that transmits a signal described in the above description, and a wireless device 150 may correspond to an STA that receives a signal described in the above description.

In this case, the station transmitting the signal may correspond to a PCP/AP or an 11ay terminal supporting an 11ay system, and the station receiving the signal may correspond to a legacy terminal (e.g., 11ad terminal) that does not support the 11ay system as well as a PCP/AP or an 11ay terminal supporting the 11ay system.

Hereinafter, for convenience of description, the STA transmitting a signal is referred to as a transmitting device 100, and the STA receiving a signal is referred to as a receiving device 150.

The transmitting device (100) may include a processor (110), a memory (120), and a transmitting/receiving unit (130), and the receiving device (150) may include a processor (160), a memory (170), and a transmitting/receiving unit (180). The transmitting/receiving unit (130, 180) transmits/receives a radio signal and may be operated in a physical layer of IEEE 802.11/3GPP, and so on. The processor (110, 160) may be operated in the physical layer and/or MAC layer and may be operatively connected to the transmitting/receiving unit (130, 180).

The processor (110, 160) and/or the transmitting/receiving unit (130, 180) may include application-specific integrated circuit (ASIC), other chipset, logic circuit and/or data processor. The memory (120, 170) may include read-only memory (ROM), random access memory (RAM), flash memory, memory card, storage medium and/or other storage unit. When the embodiments are executed by software, the techniques (or methods) described herein can be executed with modules (e.g., processes, functions, and so on) that perform the functions described herein. The modules can be stored in the memory (120, 170) and executed by the processor (110, 160). The memory (120, 170) can be implemented (or positioned) within the processor (110, 160) or external to the processor (110, 160). Also, the memory (120, 170) may be operatively connected to the processor (110, 160) via various means known in the art.

As described above, the detailed description of the preferred exemplary embodiment of the present invention is provided so that anyone skilled in the art can implement and execute the present invention. In the detailed description presented herein, although the present invention is described with reference to the preferred exemplary embodiment of the present invention, it will be understood by anyone having ordinary skills in the art that diverse modifications, alterations, and variations can be made in the present invention. Therefore, the scope and spirit of the present invention will not be limited only to the exemplary embodiments of the present invention set forth herein. Thus, it is intended to provide the broadest scope and spirit of the appended claims of the present invention that are equivalent to the disclosed principles and novel characteristics of the present invention.

INDUSTRIAL APPLICABILITY

Although the present invention has been described in detail under the assumption that the present invention can be applied to an IEEE 802.11 based wireless LAN (WLAN) system, the present invention will not be limited only to this. It will be understood that the present invention can be applied to diverse wireless systems capable of performing data transmission based on channel bonding by using the same method as presented herein.

What is claimed is:

1. A method for transmitting by a first station (STA) a physical protocol data unit (PPDU) to a second STA in a wireless local area network (WLAN) system, the method comprising:
   obtaining a first parameter including information for a tentative number of single carrier (SC) blocks of the PPDU, wherein the first parameter relates to a length equal to or greater than a length of a second portion included in the PPDU, wherein the PPDU includes a first portion and the second portion;
   setting a value of a second parameter and a value of a third parameter based on a value of the first parameter and an applied modulation and coding scheme (MCS), wherein the second parameter includes information for a number of the SC blocks of the PPDU, wherein the third parameter includes information for a length of a training field included in the PPDU;
   configuring a header field of the PPDU, wherein the header field includes the second parameter and the third parameter; and
   transmitting the PPDU based on the header field,
   wherein the PPDU is an enhanced directional multi gigabit (EDMG) PPDU, wherein the first portion is a non-EDMG portion of the EDMG PPDU, wherein the second portion is an EDMG portion of the EDMG PPDU, and wherein the header field is a legacy header (L-header) field included in the non-EDMG portion of the EDMG PPDU.

2. The method of claim 1, wherein the setting of the value of the second parameter based on the value of the first parameter and the applied MCS comprises:

setting the value of the second parameter to be equal to the value of the first parameter and setting the value of the third parameter to 0, when the applied MCS is not binary phase shift keying (BPSK);

setting the value of the second parameter to be equal to the value of the first parameter and setting the value of the third parameter to 0, when the applied MCS is BPSK and the first parameter mod 3≠1; and setting the value of the second parameter to a value smaller by 19 or 20 than the first parameter and setting the value of the third parameter to 2, when the applied MCS is BPSK and the first parameter mod 3=1.

3. The method of claim 2, wherein, when the applied MCS is BPSK and the first parameter mod 3=1, the value of the second parameter is set to a value smaller by 20 than the first parameter, when a difference value between a length of the number of SC blocks corresponding to the first parameter and the length of the second portion is equal to or greater than a length of a ½ SC block, and the value of the second parameter is set to a value smaller by 19 than the first parameter, when a difference value between a length of the number of SC blocks corresponding to the first parameter and the length of the second portion is smaller than a length of a ½ SC block.

4. The method of claim 1, wherein the first portion is transmitted earlier than the second portion in a time domain.

5. A method for receiving, by a first station (STA), a physical protocol data unit (PPDU) from a second STA in a wireless local area network (WLAN) system, the method comprising:

receiving the PPDU from the second STA, wherein the PPDU includes a first portion and a second portion, wherein a value of a second parameter and a value of a third parameter are set based on a value of a first parameter and a modulation and coding scheme (MCS) applied to the PPDU, wherein the first parameter includes a tentative number of single carrier (SC) blocks of the PPDU, wherein the first parameter relates to a length equal to or greater than a length of the second portion, wherein the second parameter includes information for a number of the SC blocks of the PPDU, wherein the third parameter includes information for a length of a training field included in the PPDU, wherein a header field of the PPDU is configured, wherein the header field includes the second parameter and the third parameter, wherein the PPDU is an enhanced directional multi-gigabit (EDMG) PPDU, wherein the first portion is a non-EDMG portion of the EDMG PPDU, wherein the second portion is an EDMG portion of the EDMG PPDU, and wherein the header field is a legacy header (L-header) field included in the non-EDMG portion of the EDMG PPDU.

6. The method of claim 5, further comprising: estimating, by the first STA, an entire length of the PPDU based on the value of the second parameter and the value of the third parameter.

7. The method of claim 6, further comprising:

setting a network allocation vector (NAV) of a channel through which the PPDU is transmitted based on an entire length of the estimated PPDU or limiting signal transmission and reception in the channel through which the PPDU is transmitted within the entire length of the estimated PPDU.

8. A station device for transmitting a physical protocol data unit (PPDU) in a wireless local area network (WLAN) system, the station device comprising:

a transceiver having at least one radio frequency (RF) chain and configured to transmit and receive a signal to and from another station device; and a processor connected to the transceiver to process a signal transmitted and received to and from the another station device, wherein the processor is configured to:

obtain a first parameter including information for a tentative number of single carrier (SC) blocks of the PPDU, wherein the first parameter relates to a length equal to or greater than a length of a second portion included in the PPDU, wherein the PPDU includes a first portion and the second portion;

set a value of a second parameter and a value of a third parameter of the header field based on a value of the first parameter and an applied modulation and coding scheme (MCS), wherein the second parameter includes information for a number of the SC blocks of the PPDU, wherein the third parameter includes information for a length of a training field included in the PPDU;

configuring a header field of the PPDU, wherein the header field includes the second parameter and the third parameter; and transmit the PPDU based on the header field, wherein the PPDU is an enhanced directional multi gigabit (EDMG) PPDU, wherein the first portion is a non-EDMG portion of the EDMG PPDU, wherein the second portion is an EDMG portion of the EDMG PPDU, and wherein the header field is a legacy header (L-header) field included in the non-EDMG portion of the EDMG PPDU.

* * * * *